United States Patent
Edanami (10) Patent No.: US 7,554,461 B2
(45) Date of Patent: Jun. 30, 2009

(54) RECORDING MEDIUM, PARKING SUPPORT APPARATUS AND PARKING SUPPORT SCREEN

(75) Inventor: Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 11/588,816

(22) Filed: Oct. 27, 2006

(65) Prior Publication Data
US 2007/0279493 A1 Dec. 6, 2007

(30) Foreign Application Priority Data
Jun. 5, 2006 (JP) ............................. 2006-155857

(51) Int. Cl.
G08G 1/14 (2006.01)
(52) U.S. Cl. .................... 340/932.2; 340/988; 340/901; 348/148
(58) Field of Classification Search ................. 340/988, 340/901, 903, 439, 995, 932.2; 348/135, 348/143, 148, 149
See application file for complete search history.

(56) References Cited

U.S. PATENT DOCUMENTS

| 6,515,597 | B1 * | 2/2003 | Wada et al. | 340/988 |
| 6,549,124 | B1 * | 4/2003 | Ishikawa et al. | 340/435 |
| 6,594,583 | B2 * | 7/2003 | Ogura et al. | 701/301 |

FOREIGN PATENT DOCUMENTS

| CN | 1132750 C | 12/2003 |
| JP | 2000-099894 | 4/2000 |
| JP | 2000-229547 | 8/2000 |
| JP | 2003-252151 | 9/2003 |

OTHER PUBLICATIONS

Hara et al., "Ray Sapce Interpolation by Look-up Table," Information Processing Society, Research Report, (43)17, Dec. 19, 2003, pp. 91-95. (English language Abstract).

* cited by examiner

Primary Examiner—Anh V La
(74) Attorney, Agent, or Firm—Greer, Burns & Crain, Ltd.

(57) ABSTRACT

A recording medium, a parking support apparatus and a parking support screen for displaying an image allow the driver of a vehicle to easily grasp the situation while maneuvering the vehicle for parking. A computer-readable recording medium storing a parking support program for causing a computer to display an image for supporting the operation of parking an own vehicle causes the computer to execute an image pickup step that shoots the environment of the own vehicle to acquire a picked up image of the environment, detects the position of the own vehicle to define it as a shooting position and stores the picked up image and the shooting position in association with each other, an image generation step that generates an environment image that is an image of the environment as viewed from a predetermined viewpoint to detect the position of the own vehicle according to the picked up image and the shooting position as stored in the image pickup step and the predetermined viewpoint and also an own vehicle image that is an image of the own vehicle as viewed from the viewpoint according to the position of the own vehicle, the profile information of the own vehicle that is stored in advance and the viewpoint and then generates a synthetic image that is an image synthesized from the environment image and the own vehicle image and a display step that displays the synthetic image generated in the image generation step.

20 Claims, 5 Drawing Sheets

RECORDING MEDIUM, PARKING SUPPORT APPARATUS AND PARKING SUPPORT SCREEN

BACKGROUND OF THE INVENTION

1. Field of the Invention

The present invention relates to a recording medium, a parking support apparatus and a parking support screen for supporting the operation of parking a vehicle by the driver.

2. Description of the Related Art

Systems for supporting the operation of parking a vehicle by the driver have been proposed in recent years.

Parking support systems adapted to display a plan view of the vehicle to be parked and its vicinity to support the parking operation are known as prior art (see, for example, Patent Document 1: Jpn. Pat. Appln. Laid-Open Publication No. 2003-252151). The parking support system proposed in the above cited patent document is designed to detect positional relationship between the vehicle to be parked (to be referred to as own vehicle) and the other vehicle or vehicles located near the parking space as obstacles according to the left and right images of the own vehicle that are picked up by the cameras arranged at the left and right sides of the front line of the own vehicle, the distance by which the own vehicle has moved and the change in the direction of the own vehicle, generates a synthetic image showing the positional relationship as a plan view and outputs it to a display apparatus.

Techniques are also known to generate an image from an arbitrarily selected angle of view by interpolating the plurality of images picked up by one or more than one cameras (see, for example, Non-Patent Document 1: Information Processing Society, Research Report 2003-AVM-43(17) (2003)).

However, it is very strange for a driver to maneuver a vehicle while watching a bird eye view. Drivers are not used to drive a car while watching a bird eye view in ordinary situations and hence become at a loss when they are forced to maneuver a vehicle while watching a bird eye view only when parking a vehicle. Additionally, it is difficult for a driver to accurately grasp the situation surrounding the own vehicle and, for example, find a small gap between the own vehicle and a vehicle staying near by, simply by watching a bird eye view.

Additionally, when a bird eye view is synthesized from images showing a vehicle moving on the ground, the three-dimensionally expressed objects in the bird eye view such as the vehicles staying nearby may be extremely deformed and appear very strange to the viewer.

SUMMARY OF THE INVENTION

In view of the above identified circumstances, it is therefore the object of the present invention to provide a recording medium, a parking support apparatus and a parking support screen for displaying an image that allows the driver of a vehicle to easily grasp the situation while maneuvering the vehicle for parking.

In an aspect of the present invention, the above object is achieved by providing a computer-readable recording medium storing a parking support program for causing a computer to display an image for supporting the operation of parking an own vehicle, the program causing the computer to execute: an image pickup step that shoots the environment of the own vehicle to acquire a picked up image of the environment, detects the position of the own vehicle to define it as a shooting position and stores the picked up image and the shooting position in association with each other; an image generation step that generates an environment image that is an image of the environment as viewed from a predetermined viewpoint to detect the position of the own vehicle according to the picked up image and the shooting position as stored in the image pickup step and the predetermined viewpoint and also an own vehicle image that is an image of the own vehicle as viewed from the viewpoint according to the position of the own vehicle, the profile information of the own vehicle that is stored in advance and the viewpoint and then generates a synthetic image that is an image synthesized from the environment image and the own vehicle image; and a display step that displays the synthetic image generated in the image generation step.

Thus, with a recording medium according to the present invention as defined above, the driver of the vehicle can easily grasp the situation surrounding the own vehicle in an operation of parking the own vehicle as the recording medium can be used to display an image of the own vehicle and the environment as viewed from the driver's seat.

Additionally, in a recording medium according to the present invention as defined above, it may be so arranged that the image pickup step is executed when the own vehicle is maneuvered to move forward, whereas the image generation step and the display step are executed when the own vehicle is maneuvered to move backward.

Thus, a recording medium as defined above supports the vehicle maneuvering operation of the driver as the target position for parking is confirmed when the driver is maneuvering the own vehicle to move forward and displayed when the driver is maneuvering the own vehicle to move backward subsequently.

Still additionally, in a recording medium according to the present invention as defined above, it may be so arranged that the image generation step detects a reference object that operates as reference for the target position for parking according to the picked up image and the shooting position acquired by the image pickup step and selects the viewpoint according to the reference objects.

Thus, a recording medium as defined above can select a viewpoint according to the position of an object or the positions of a plurality of objects that can be an obstacle or obstacles, whichever appropriate, for the parking operation.

Still additionally, in a recording medium according to the present invention as defined above, it may be so arranged that the image generation step selects the viewpoint according to the detected position of the own vehicle and the profile information of the own vehicle.

Still additionally, in a recording medium according to the present invention as defined above, it may be so arranged that the reference object is an adjacent vehicle parking adjacently relative to the target position and the image generation step selects the viewpoint on the prolonged line of the adjacent lateral surface of the adjacent vehicle.

Alternatively, in a recording medium according to the present invention as defined above, it may be so arranged that the reference object is a straight line segment defining the boundary of the target position and the image generation step selects the viewpoint on the prolonged line of the straight line segment.

Still alternatively, in a recording medium according to the present invention as defined above, it may be so arranged that the image generation step selects the viewpoint on the prolonged line of a lateral surface of the own vehicle.

Still additionally, in a recording medium according to the present invention as defined above, it may be so arranged that the image generation step predicts a plurality of positions of the own vehicle in the future as predicted positions of the own vehicle according to the current position and the steering angle of the own vehicle and generates own vehicle images corresponding to the predicted positions of the own vehicle and then synthetic images corresponding to the own vehicle images and the display step successively displays the synthetic images corresponding to the predicted positions of the own vehicle.

Still additionally, in a recording medium according to the present invention as defined above, it may be so arranged that the image generation step generates the environment image according to the picked up image, the shooting position and the predetermined viewpoint by means of the technique of a free view camera.

Still additionally, in a recording medium according to the present invention as defined above, it may be so arranged that the image generation step generates the environment image as a picked up image that corresponds to the shooting position closest to the viewpoint.

Still additionally, in a recording medium according to the present invention as defined above, it may alternatively be so arranged that the image generation step defines a plurality of viewpoints and generates environment images or synthetic images corresponding to the viewpoints and the display step arranges and displays the plurality of images generated by the image generation step at respective predetermined positions.

Still additionally, in a recording medium according to the present invention as defined above, it may be so arranged that the image generation step generates a first synthetic image including the left side of the target position for parking and a second synthetic image including the right side of the target position for parking and the display step displays the first synthetic image and the second synthetic image side by side.

Still additionally, in a recording medium according to the present invention as defined above, it may be so arranged that the image generation step further generates an environment image including entirely the target position and the display step further displays the environment image.

In another aspect of the present invention, there is provided a parking support apparatus for displaying an image for supporting the operation of parking an own vehicle, the apparatus comprising: an own vehicle position detecting section that detects the position of the own vehicle; an image pickup section that acquires the position of the own vehicle as detected by the own vehicle position detecting section as a shooting position, shoots the environment of the own vehicle to acquire a picked up image of the environment and stores the picked up image and the shooting position in association with each other; an image generating section that generates an environment image that is an image of the environment as viewed from a predetermined viewpoint according to the picked up image and the shooting position as stored in the image pickup section and the predetermined viewpoint and also an own vehicle image that is an image of the own vehicle as viewed from the viewpoint as detected by the own vehicle position detecting section, the profile information of the own vehicle that is stored in advance and the viewpoint and then generates a synthetic image that is an image synthesized from the environment image and the own vehicle image; and a display section that displays the synthetic image generated by the image generation section.

In still another aspect of the present invention, there is provided a parking support screen for displaying images to support parking of an own vehicle, the screen comprising: an environment display section that displays an environment image that is an image of the environment of the own vehicle viewed from a viewpoint outside the own vehicle and generated according to an image picked up by a camera arranged in the own vehicle; an own vehicle display section that displays an own vehicle image that is an image of the own vehicle viewed from the viewpoint outside the own vehicle and generated according to the profile information of the own vehicle stored in advance as an image superimposed on the environment image displayed in the environment display section.

Additionally, in a parking support screen according to the present invention as defined above, it may be so arranged that the environment display section and the own vehicle display section display respective images when the own vehicle is maneuvered to move backward.

Still additionally, in a parking support screen according to the present invention as defined above, it may be so arranged that the own vehicle display section successively displays images of the own vehicle generated corresponding to a plurality of predicted positions of the own vehicle in the future.

Still additionally, in a parking support screen according to the present invention as defined above, it may be so arranged that the environment display section displays environment images generated corresponding to a plurality of viewpoints and arranged at predetermined positions and the own vehicle display section displays an image of the own vehicle generated corresponding to at least one of the plurality of viewpoints and superimposed on the corresponding environment image.

Still additionally, in a parking support screen according to the present invention as defined above, it may be so arranged that the environment image display section displays a first environment image including the left side of a target position for parking and a second environment image including the right side of the target position for parking and the own vehicle display section displays an image of the own vehicle corresponding to and superimposed on the first environment image and another image of the own vehicle corresponding to and superimposed on the second environment image.

Still additionally, in a parking support screen according to the present invention as defined above, it may be so arranged that the environment display section displays a third environment map entirely including the target position.

The present invention encompasses methods, apparatus, systems and recording mediums realized by using any of the components or any combination of any of the components of the present invention.

Thus, according to the present invention, it is possible to display one or more than one images with which the driver of a vehicle can grasp the situation when maneuvering the vehicle for parking.

DETAILED DESCRIPTION OF THE PREFERRED EMBODIMENTS

Now, the present invention will be described in greater detail by referring to the accompanying drawings that illustrate a preferred embodiment of the invention.

Firstly, the configuration of the illustrated embodiment of the present invention, which is a parking support apparatus, will be described below.

Figure 1:
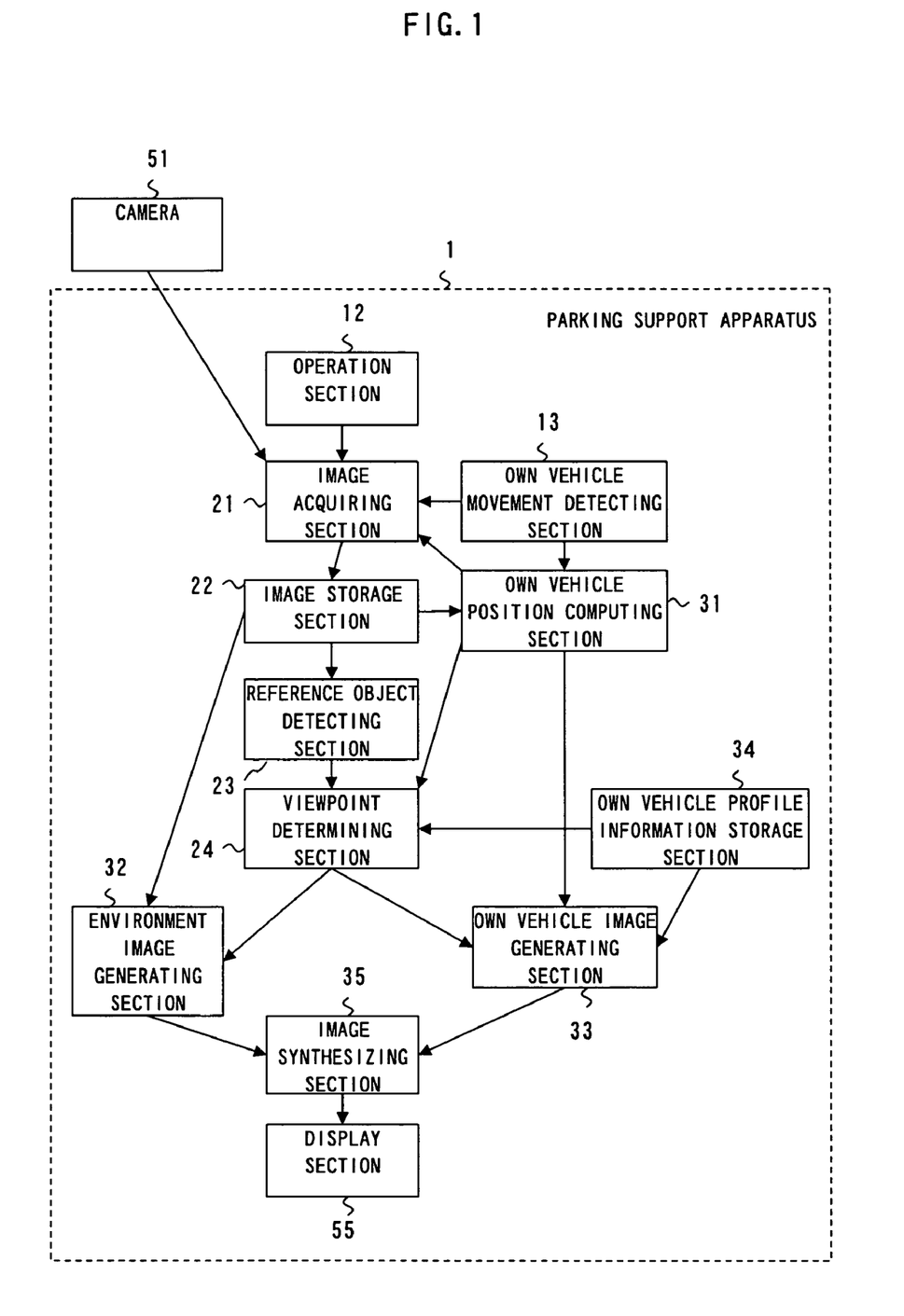
FIG. 1 is a schematic block diagram of an embodiment of parking support apparatus according to the present invention, showing the configuration thereof.

FIG. 1 is a schematic block diagram of the embodiment of parking support apparatus, showing the configuration thereof. The parking support apparatus 1 is arranged in a vehicle and comprises an operation section 12, an own vehicle movement detecting section 13, an image acquiring section 21, an image storage section 22, a reference object detecting section 23, a viewpoint determining section 24, an own vehicle position computing section 31, an environment image generating section 32, an own vehicle image generating section 33, an own vehicle profile information storage section 34, an image synthesizing section 35 and a display section 55. The parking support apparatus 1 is connected to one or more than one cameras 51 arranged in the same vehicle. The operation section 12 typically includes buttons to be operated by the driver of the vehicle. Typically two cameras 51 are provided. One of them is adapted to shoot the surrounding environment in the left side direction of the vehicle, while the other is adapted to shoot the surrounding environment in the right side direction of the vehicle. The own vehicle movement detecting section 13 detects the pulse telling the moving speed of the vehicle and the steering angle of the vehicle and includes a gyro sensor for detecting the direction of the own vehicle.

Now, the operation of this embodiment of the parking support apparatus will be described below.

Figure 2:
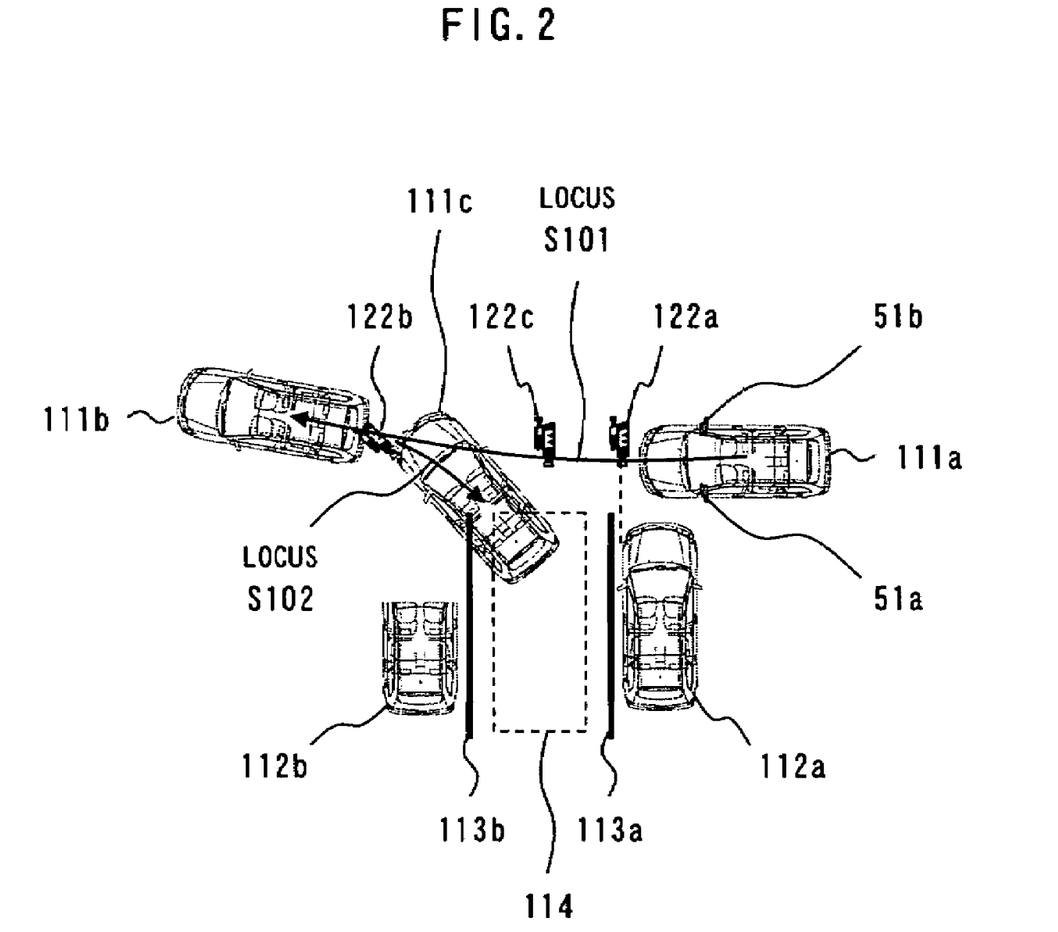
FIG. 2 is a schematic plan view of a parking lot, illustrating how the driver of a vehicle is maneuvering his or her own vehicle for parking by means of the embodiment of the parking support apparatus of FIG. 1.

A driver driving a vehicle and trying to park the vehicle in a parking lot generally reduces the moving speed of the vehicle as the vehicle approaches the parking lot and then maneuvers the vehicle so as to move it forwardly until it passes by the front side of the target position for parking and subsequently backwardly in order to get into the target position. FIG. 2 is a schematic plan view of a parking lot as viewed from above, illustrating how the driver of a vehicle is maneuvering his or her own vehicle for parking by means of the embodiment of the parking support apparatus of FIG. 1. FIG. 2 shows the own vehicle position 111a when the driver starts moving the vehicle forward (locus S101), the own vehicle position 111b when the driver starts moving the vehicle backward (locus S102) and the own vehicle position 111c on the way of moving the vehicle backward. FIG. 2 additionally shows the adjacent vehicles 112a, 112b parking at the respective sides of the target position 114 and white lines 113a, 113b showing the boundary of the target position 114. The own vehicle is provided with the camera 51a for shooting the surrounding environment in the left direction relative to the own vehicle and the camera 51b for shooting the surrounding environment in the right direction relative to the own vehicle.

Figure 3:
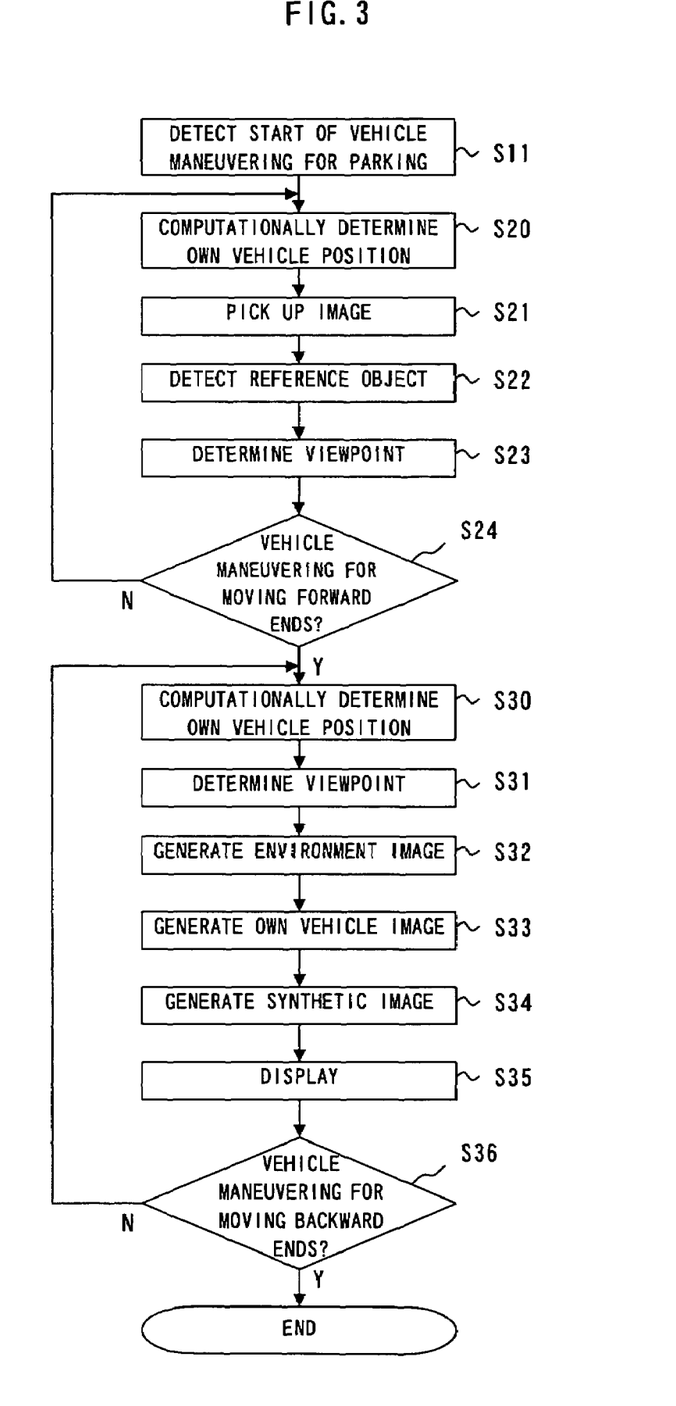
FIG. 3 is a flowchart of the operation of the embodiment of the parking support apparatus of FIG. 1.

FIG. 3 is a flowchart of the operation of the parking support apparatus of this embodiment. Referring to FIG. 3, the operation starts when the operation section 12 or the own vehicle movement detecting section 13 detects the start of a parking operation (S11). The expression of the start of a parking operation as used herein refers to an operation by the driver of depressing the button for starting a parking operation at the operation section 12 or the time when the own vehicle movement detecting section 13 that monitors the pulse telling the moving speed of the vehicle detects that the moving speed of the vehicle is reduced to fall into a predetermined speed range.

Then, the own vehicle position computing section 31 computationally determines the current position (and the angle) of the own vehicle (S20) and the image acquiring section 21 shoots the environment of the outside of the vehicle by means of the cameras 51 and stores the picked up image that is the image picked up by the shooting and the shooting position that is the own vehicle position in the image storage section 22 (S21). The own vehicle position computing section 31 then computationally determines the own vehicle position according to the stereo view obtained by using a plurality of picked up images stored in the image storage section 22 or the pulse telling the moving speed of the vehicle, the steering angle and the reading of the gyro sensor as monitored and detected by the own vehicle movement detecting section 13.

Then, the reference object detecting section 23 detects the position of a reference object that is an object to be used for identifying the target position 114 from the picked up image acquired by the image acquiring section 21 (S22). In the instance of FIG. 2, the reference object to be detected may be the white line 113a or 113b, the adjacent vehicle 112a or 112b. The reference object detecting section 23 typically detects edges in the picked up image and defines the edge position that provides the largest number of vertical edge components as the position of a while line or that of an adjacent vehicle.

Then, the viewpoint determining section 24 determines the viewpoints that satisfies the predefined requirements according to the position of the reference object as detected by the reference object detecting section 23 (S23). Assume here that the determined viewpoints are viewpoints 122a, 122c in FIG. 2. The viewpoint 122a is defined on the prolonged line of the lateral surface located at the side of the white line 113a of the adjacent vehicle 112a according to the position of the adjacent vehicle 112a and that of the white line 113a as detected by the reference object detecting section 23. On the other hand, the viewpoint 122c is defined to be a point that can view the adjacent vehicle 112, the target position 114 and the adjacent vehicle 112b.

Thereafter, the own vehicle movement detecting section 13 determines if the forward movement of the vehicle has ended or not (S24). The own vehicle movement determining section 13 returns to the processing step S21 when the forward movement of the vehicle has not ended yet (S24, N). When, on the other hand, the forward movement of the vehicle has ended (S24, Y), the own vehicle movement determining section 13 computationally determines the current position of the own vehicle (S30) and the viewpoint determining screw 24 determines a viewpoint that satisfies the predefined requirements according to the position of the own vehicle as computationally determined by the own vehicle position computing section 31 and the own vehicle profile information stored in the own vehicle profile storing section 34 (S31). Assume here that the viewpoint determined here is a viewpoint 122b in FIG. 2. The viewpoint 122b is on the prolonged line of the lateral surface of the own vehicle at the current position that is located at the side of the adjacent vehicle 112b.

Then, the environment image generating section 32 generates an environment image that is an image of the environment as viewed from the viewpoint determined by the viewpoint determining section 24 by means of the technique of a free view camera from the plurality of picked up images stored in the image storage section 22 (S32). Note that the environment image generating section 32 may be so adapted as to select the picked up image that corresponds to the shooting position closest to the viewpoint as determined by the viewpoint determining section 24 instead of using the technique of a free view camera.

Subsequently, the own vehicle image generating section 33 generates an image of the own vehicle that is an image showing the appearance of the own vehicle according to the position of the own vehicle as computationally determined by the own vehicle position computing section 31, the profile of the own vehicle as stored in the own vehicle profile storage section 34 and the viewpoint as determined by the viewpoint determining section 24 (S33). The own vehicle profile information is data on the three-dimensional structure of the own vehicle, which may typically be the data extracted from the CAD (computer aided design) data obtained at the time of designing the own vehicle. The image of the own vehicle is an image as viewed from the viewpoint determined by the viewpoint determining section 24 that shows the appearance (outer profile) of the own vehicle located at the position of the own vehicle as computationally determined by the own vehicle position computing section 31. However, the image of the own vehicle may alternatively be an image expressed by surfaces or lines extracted from the data on the three-dimensional structure of the own vehicle.

Then, the image synthesizing section 35 synthetically combines the environment image generated by the environment image generating section 32 and the image of the own vehicle generated by the own vehicle image generating section 33 to produce a synthetic image for each of the viewpoints (S34) and generates a display image showing the synthetic images from the viewpoints and/or the environment image arranged at predetermined respective positions so as to have the display section 55 display it (S35).

Thus, the driver can easily grasp the distance between the own vehicle and each of the obstacles as he or she can see the own vehicle as viewed from important viewpoints and the environment in the display image when maneuvering the vehicle to move backward.

Figure 4:
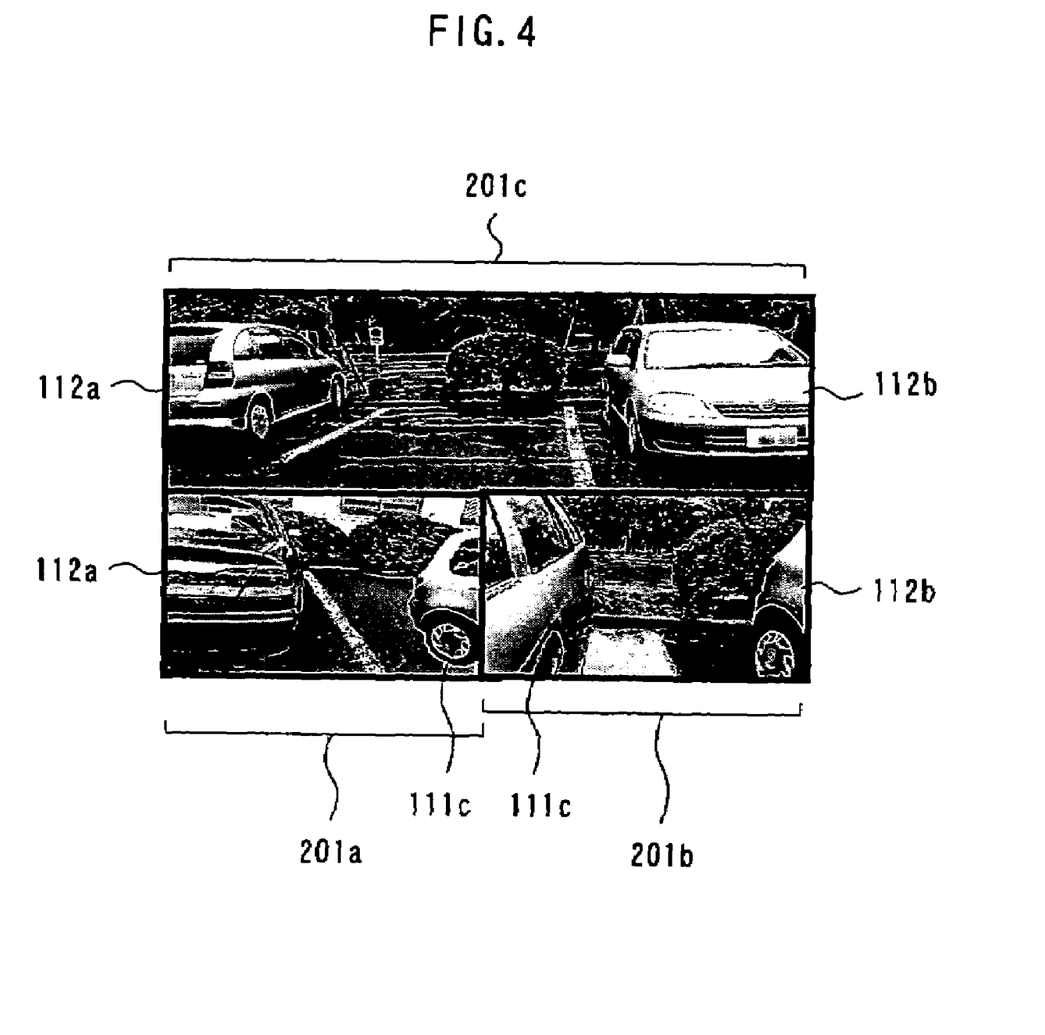
FIG. 4 is a first example of display image of the embodiment of the parking support apparatus of FIG. 1.

The positional arrangement of the synthetic images and the environment image in the display image will be discussed below. FIG. 4 is a first example of displayed image of this embodiment of the parking support apparatus. The image is to be displayed when the driver is maneuvering the own vehicle to move backward and gets to the own vehicle position 111c in FIG. 2. The image synthesizing section 35 arranges the three images 201a, 201b, 201c in the display image corresponding to the positions of the viewpoints.

The image 201a corresponds to the left side viewpoint 122a when facing the target position 114. It is a synthetic image formed by synthetically combining an environment image that includes the adjacent vehicle 112a (environment display section) and an image of the own vehicle showing the own vehicle at the own vehicle position 111c (own vehicle display section) and arranged in a lower left part of the display image. The image 201b corresponds to the right side viewpoint 122b when facing the target position 114. It is a synthetic image formed by synthetically combining an environment image that includes the adjacent vehicle 112b (environment display section) and an image of the own vehicle showing the own vehicle at the own vehicle position 111c and arranged in a lower right part of the display image. The image 201c corresponds to the viewpoint 122c from which it is possible to see the entire target position 114. It is an environment image including the adjacent vehicle 112a, the parking position and the adjacent vehicle 112b (environment display section), which is arranged in the upper half of the display image. In other words, in the instance of FIG. 2, virtual cameras are arranged at the appropriate viewpoints 122a, 122b, 122c and the images picked up by the cameras are displayed in the display image. The image 201c is an environment image formed by using a plurality of picked up images so that it can show an area wider than the area of any of the picked up images.

While a plurality of synthetic images and/or a plurality of environment images are arranged at predetermined positions in the display image in the above description, the display image may be a single synthetic image. When the display image is to be used as a mirror image for the driver, the lateral sides of the image may be inverted and the positional arrangement of the component images may also be inverted. Additionally, the image 201c may be arranged in the lower half of the display image.

Thus, the display image shows the entire target position 114 and the positional relationship between the own vehicle and the obstacles found at the lateral sides of the target position 114 so that the driver can easily grasp the situation when maneuvering the vehicle to move backward. Particularly, each of the images 201a and 201b is formed by superimposing an environment image showing the surroundings including the related adjacent vehicle and an image showing the appearance of the own vehicle that is stored in advance so that the driver may feel as if he or she were out of the own vehicle to see the space separating each of the adjacent vehicles and the own vehicle while sitting on the driver's seat.

Now, the operation of displaying synthetic images corresponding to predicted positions of the own vehicle will be described below.

If the driver operates the operation section 12 to issue a command for predicting the position of the own vehicle while maneuvering the vehicle to move backward, the own vehicle position computing section 31 computationally determines predicted positions of the own vehicle, or predictable positions of the own vehicle, according to the current position of the own vehicle and the steering angle as detected by the own vehicle movement detecting section 13. More specifically, the own vehicle movement computing section 31 computationally determines a plurality of predicted positions of the own vehicle on the predicted locus of the own vehicle. Then, the own vehicle image generating section 33 generates an image of the own vehicle for each of the predicted positions of the own vehicle while the image synthesizing section 35 generates a synthetic image for each of the predicted positions of the own vehicle and the display section 55 displays the synthetic image for each of the predetermined positions of the own vehicle as moving image. It may alternatively be so arranged that the viewpoint determining section 24 determines viewpoints according to the predicted positions of the own vehicle and the environment image generating section 32 generates environment images as viewed from the respective viewpoints while the own vehicle image generating section 33 generates images of the own vehicle as viewed from the respective viewpoints.

Thus, with the synthetic images that correspond to the predicted positions of the own vehicle, the driver can easily grasp the locus of the own vehicle as predicted for the current steering angle.

Figure 5:
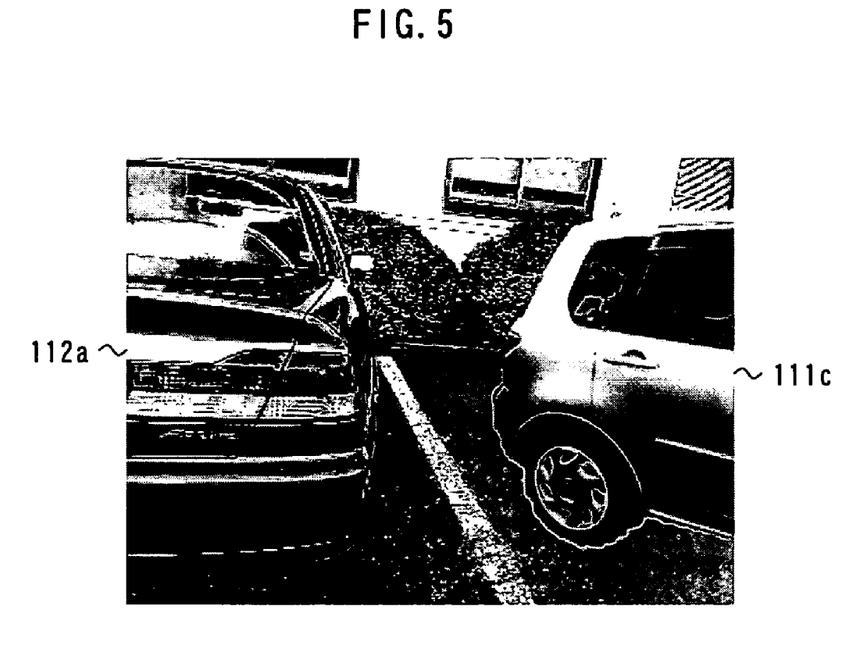
FIG. 5 is a second example of display image of the embodiment of the parking support apparatus of FIG. 1.
Figure 6:
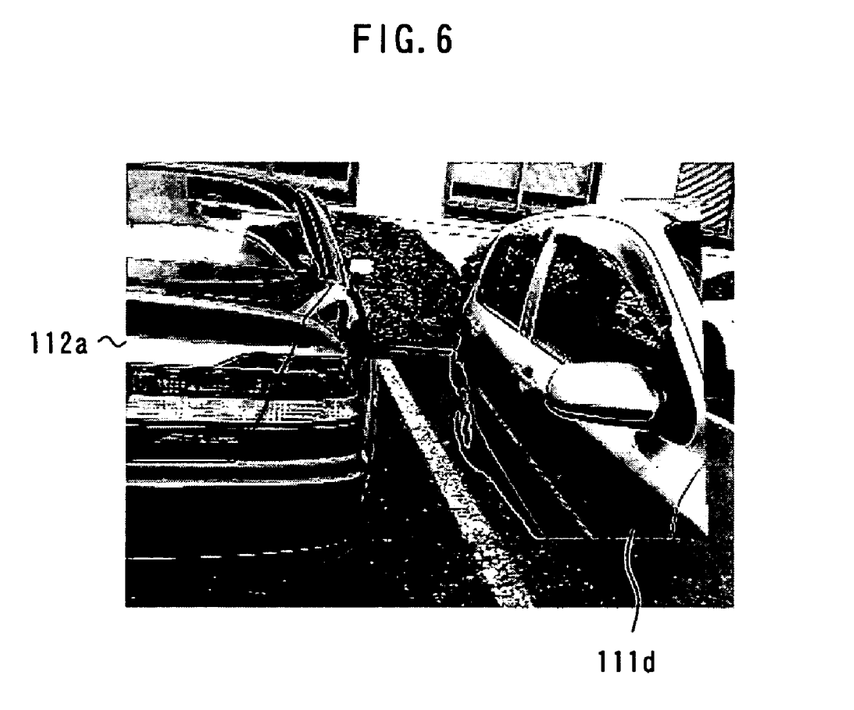
FIG. 6 is a third example of display image of the embodiment of the parking support apparatus of FIG. 1.

Now, the change in the display image while the driver is maneuvering the own vehicle to move backward will be described blow. FIG. 5 is a second example of display image of this embodiment of the parking support apparatus. FIG. 6 is a third example of display image of this embodiment of the parking support apparatus. Only the image 201a in FIG. 4 is changed in FIGS. 5 and 6. The display image changes from FIG. 5 to FIG. 6 in accordance with the change in the position of the own vehicle while the driver is maneuvering the vehicle to move backward.

Thus, with the display images, the driver can maneuver the own vehicle to move backward, always appropriately grasping the situation at any time, as images of the own vehicle as viewed from viewpoints important to the driver for maneuvering the own vehicle to move backward and an environment image are displayed on a real time basis. Additionally, from the viewpoints, the driver accurately grasps the space separating the own vehicle and each of the adjacent vehicles.

Then, the own vehicle movement detecting section 13 determines if the operation of maneuvering the own vehicle to move backward has ended or not (S36). For this step of operation, the own vehicle movement detecting section 13 detects the end of the operation of maneuvering the own vehicle to move backward when the gear is released from the backward movement position. The own vehicle movement detecting section 13 returns to the processing step S30 when the operation of maneuvering the own vehicle to move backward has not ended yet (S36, N). When, on the other hand, the operation of maneuvering the own vehicle to move backward has ended (S36, Y), the own vehicle movement detecting section 13 terminates the flow of operation.

Thus, with this embodiment of the invention, the driver can maneuver the own vehicle to move backward by viewing an image that makes the driver feel as if he of she were out of the own vehicle for areas that the driver cannot clearly see by means of the cameras and the mirrors arranged on the own vehicle. Additionally, if compared with the conventional technique of converting picked up images into a plan view, the technique of a free view camera and that of selecting one or more than one picked up images require a smaller amount of computations so that it is possible to facilitate the design of a parking support apparatus and display images on a real time basis and according to predictions.

The image pickup step in the claims corresponds to the processing steps S20, S21 of the above-described embodiment. The image generation step in the claims corresponds to the processing steps S22 through S34 of the above-described embodiment. The display step in the claims corresponds to the processing step S35 of the above-described embodiment. Finally, the image generating section in the claims corresponds to the environment image generating section 32, the own vehicle image generating section 33 and the image synthesizing section 35 of the above-described embodiment.

The parking support apparatus of this embodiment easily can find applications in information processing apparatus mounted on vehicles to enhance the performance of information processing apparatus mounted on vehicles, to which the embodiment is applied. For the purpose of the present invention, information processing apparatus mounted on vehicles include car navigation systems and ECUs (electric control units).

According to the present invention, it is possible to provide a program for causing the computer of a parking support apparatus to execute the above-described steps as a parking support program. The program can be executed by the computer of a parking support apparatus when it is stored in a computer readable recording medium. Computer readable recording mediums that can be used for the purpose of the present invention include internal storage apparatus such as ROMs and RAMs mounted in computers, portable type storage mediums such as CD-ROMs, flexible disks, DVD disks, magneto-optical disks and IC cards, databases holding computer programs, external computers, databases of such computers and transmission mediums on communication lines.

What is claimed is:

1. A computer-readable recording medium storing a parking support program for causing a computer to display an image for supporting the operation of parking an own vehicle, the program causing the computer to execute:

an image pickup step that shoots the environment of the own vehicle to acquire a picked up image of the environment, detects the position of the own vehicle to define it as a shooting position and stores the picked up image and the shooting position in association with each other;

an image generation step that generates an environment image that is an image of the environment as viewed from a predetermined viewpoint according to the picked up image, the shooting position as stored in the image pickup step and the predetermined viewpoint and also generates an own vehicle image that is an image of the own vehicle as viewed from the viewpoint according to the position of the own vehicle, the profile information of the own vehicle that is stored in advance and the viewpoint and then generates a synthetic image that is an image synthesized from the environment image and the own vehicle image; and a display step that displays the synthetic image generated in the image generation step.

2. The recording medium according to claim 1, wherein the image pickup step is executed when the own vehicle is maneuvered to move forward, whereas the image generation step and the display step are executed when the own vehicle is maneuvered to move backward.

3. The recording medium according to claim 1, wherein the image generation step detects a reference object that operates as reference for the target position for parking according to the picked up image and the shooting position acquired by the image pickup step and selects the viewpoint according to the reference objects.

4. he recording medium according to claim 1, wherein the image generation step selects the viewpoint according to the detected position of the own vehicle and the profile information of the own vehicle.

5. The recording medium according to claim 3, wherein the reference object is an adjacent vehicle parking adjacently relative to the target position and the image generation step selects the viewpoint on the prolonged line of the adjacent lateral surface of the adjacent vehicle.

6. The recording medium according to claim 3, wherein the reference object is a straight line segment defining the boundary of the target position and the image generation step selects the viewpoint on the prolonged line of the straight line segment.

7. The recording medium according to claim 4, wherein the image generation step selects the viewpoint on the prolonged line of a lateral surface of the own vehicle.

8. The recording medium according to claim 1, wherein the image generation step predicts a plurality of positions of the own vehicle in the future as predicted positions of the own vehicle according to the current position and the steering angle of the own vehicle and generates own vehicle images corresponding to the predicted positions of the own vehicle and then synthetic images corresponding to the own vehicle images; and the display step successively displays the synthetic images corresponding to the predicted positions of the own vehicle.

9. The recording medium according to claim 1, wherein the image generation step generates the environment image according to the picked up image, the shooting position and the predetermined viewpoint by means of the technique of a free view camera.

10. The recording medium according to claim 1, wherein the image generation step generates the environment image as a picked up image that corresponds to the shooting position closest to the viewpoint.

11. The recording medium according to claim 1, wherein
the image generation step defines a plurality of viewpoints and generates environment images or synthetic images corresponding to the viewpoints; and
the display step arranges and displays the plurality of images generated by the image generation step at respective predetermined positions.

12. The recording medium according to claim 11, wherein
the image generation step generates a first synthetic image including the left side of the target position for parking and a second synthetic image including the right side of the target position for parking; and
the display step displays the first synthetic image and the second synthetic image side by side.

13. The recording medium according to claim 12, wherein
the image generation step further generates an environment image including entirely the target position; and
the display step further displays the environment image.

14. A parking support apparatus for displaying an image for supporting the operation of parking an own vehicle, the apparatus comprising:
an own vehicle position detecting section that detects the position of the own vehicle;
an image pickup section that acquires the position of the own vehicle as detected by the own vehicle position detecting section as a shooting position, shoots the environment of the own vehicle to acquire a picked up image of the environment and stores the picked up image and the shooting position in association with each other;
an image generating section that generates an environment image that is an image of the environment as viewed from a predetermined viewpoint according to the picked up image and the shooting position as stored in the image pickup section and the predetermined viewpoint and also an own vehicle image that is an image of the own vehicle as viewed from the viewpoint as detected by the own vehicle position detecting section, the profile information of the own vehicle that is stored in advance and the viewpoint and then generates a synthetic image that is an image synthesized from the environment image and the own vehicle image; and
a display section that displays the synthetic image generated by the image generation section.

15. A parking support screen for displaying images to support parking of an own vehicle, the screen comprising:
an environment display section that displays an environment image that is an image of the environment of the own vehicle viewed from a viewpoint outside the own vehicle and generated according to an image picked up by a camera arranged in the own vehicle;
an own vehicle display section that displays an own vehicle image that is an image of the own vehicle viewed from the viewpoint outside the own vehicle and generated according to the profile information of the own vehicle stored in advance as an image superimposed on the environment displayed in the environment display section, wherein
the viewpoint is selected according to a reference object that operates as a reference for a target position for parking according to the image picked up by the camera.

16. The parking support screen according to claim 15, wherein
the environment display section and the own vehicle display section display respective images when the own vehicle is maneuvered to move backward.

17. The parking support screen according to claim 15, wherein
the own vehicle display section successively displays images of the own vehicle generated corresponding to a plurality of predicted positions of the own vehicle in the future.

18. The parking support screen according to claim 15, wherein
the environment display section displays environment images generated corresponding to a plurality of viewpoints and arranged at predetermined positions and the own vehicle display section displays an image of the own vehicle generated corresponding to at least one of the plurality of viewpoints and superimposed on the corresponding environment image.

19. The parking support screen according to claim 18, wherein
the environment image display section displays a first environment image including the left side of a target position for parking and a second environment image including the right side of the target position for parking; and
the own vehicle display section displays an image of the own vehicle corresponding to and superimposed on the first environment image and another image of the own vehicle corresponding to and superimposed on the second environment image.

20. The parking support screen according to claim 19, wherein
the environment display section displays a third environment map entirely including the target position.

* * * * *

UNITED STATES PATENT AND TRADEMARK OFFICE
CERTIFICATE OF CORRECTION

PATENT NO.       : 7,554,461 B2
APPLICATION NO.  : 11/588816
DATED            : June 30, 2009
INVENTOR(S)      : Edanami It is certified that error appears in the above-identified patent and that said Letters Patent is hereby corrected as shown below:

Col. 10, Line 36 Claim 4    Delete "he" and insert --The-- in its place.

Signed and Sealed this

Fifteenth Day of September, 2009

David J. Kappos
*Director of the United States Patent and Trademark Office*